United States Patent
Li et al.

(10) Patent No.: US 11,206,132 B2
(45) Date of Patent: Dec. 21, 2021

(54) MULTIPARTY SECURE COMPUTING METHOD, DEVICE, AND ELECTRONIC DEVICE

(71) Applicant: ADVANCED NEW TECHNOLOGIES CO., LTD., Grand Cayman (KY)

(72) Inventors: Lichun Li, Hangzhou (CN); Shan Yin, Hangzhou (CN); Huazhong Wang, Hangzhou (CN); Wenzhen Lin, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 17/086,382

(22) Filed: Oct. 31, 2020

(65) Prior Publication Data

US 2021/0051001 A1    Feb. 18, 2021

Related U.S. Application Data

(63) Continuation of application No. PCT/CN2019/092340, filed on Jun. 21, 2019.

(30) Foreign Application Priority Data

Aug. 14, 2018 (CN) .......................... 201810925187.4

(51) Int. Cl.
*H04L 9/32* (2006.01)
*H04L 9/08* (2006.01)
*H04L 9/06* (2006.01)

(52) U.S. Cl.
CPC .............. *H04L 9/088* (2013.01); *H04L 9/065* (2013.01); *H04L 9/0869* (2013.01)

(58) Field of Classification Search
None
See application file for complete search history.

(56) References Cited

U.S. PATENT DOCUMENTS 7,086,086 B2   8/2006  Ellis
7,131,004 B1 * 10/2006 Lyle .......................... H04L 9/12
                                                          713/169

(Continued)

FOREIGN PATENT DOCUMENTS

CN    102984156 A    3/2013
CN    103248478 A    8/2013

(Continued)

OTHER PUBLICATIONS

Search Report for Taiwanese Application No. 108120608 dated Mar. 25, 2020.

(Continued)

*Primary Examiner* — Phy Anh T Vu (57) ABSTRACT

Embodiments of a secure multi-party computation method applicable to any one computing node of a plurality of computing nodes deployed in a distributed network are provided. The plurality of computing nodes jointly participate in a secure multi-party computation based on private data held by each computing node. The computing node is connected to a trusted key source, and the method includes: obtaining a trusted key from the trusted key source; encrypting the private data held by the computing node based on the obtained trusted key to obtain ciphertext data; transmitting a computing parameter comprising at least the ciphertext data to other computing nodes participating in the secure multi-party computation, so that the other computing nodes perform the secure multi-party computation based on collected computing parameters transmitted by the computing nodes participating in the secure multi-party computation.

18 Claims, 2 Drawing Sheets

(56) References Cited

U.S. PATENT DOCUMENTS

| | | | |
|---|---|---|---|
| 8,340,287 B2 | 12/2012 | Sandhu et al. | |
| 10,382,205 B1 | 8/2019 | Ko | |
| 10,404,471 B1 | 9/2019 | Griffin et al. | |
| 10,579,825 B2 | 3/2020 | Miller | |
| 10,581,812 B2* | 3/2020 | Rohloff | H04L 9/30 |
| 10,776,696 B2 | 9/2020 | Katz et al. | |
| 10,805,393 B2 | 10/2020 | Grefen et al. | |
| 2013/0251145 A1 | 9/2013 | Lowans et al. | |
| 2013/0275752 A1 | 10/2013 | Zhang et al. | |
| 2015/0172049 A1* | 6/2015 | Chida | G06F 21/606 380/46 |
| 2017/0352027 A1 | 12/2017 | Zhang et al. | |
| 2018/0049043 A1 | 2/2018 | Hoffberg | |
| 2018/0219677 A1* | 8/2018 | Nair | H04L 9/0825 |
| 2018/0254887 A1* | 9/2018 | Ateniese | G06F 3/0659 |
| 2018/0300693 A1 | 10/2018 | Gopinath et al. | |
| 2019/0044703 A1 | 2/2019 | Smith | |
| 2019/0164153 A1 | 5/2019 | Agrawal et al. | |
| 2019/0165943 A1 | 5/2019 | Chari et al. | |
| 2019/0222414 A1* | 7/2019 | Pe'er | G06F 21/602 |
| 2019/0243572 A1 | 8/2019 | Kursun | |
| 2019/0251558 A1* | 8/2019 | Liu | G06Q 20/3829 |
| 2019/0312734 A1* | 10/2019 | Wentz | H04L 9/3247 |
| 2020/0007311 A1 | 1/2020 | Oberhofer et al. | |
| 2020/0136815 A1* | 4/2020 | Trevethan | H04L 9/30 |
| 2020/0211105 A1* | 7/2020 | Du | H04L 63/0428 |
| 2021/0091929 A1* | 3/2021 | Veeningen | H04L 9/3242 |

FOREIGN PATENT DOCUMENTS

| | | |
|---|---|---|
| CN | 103888262 A | 6/2014 |
| CN | 104521178 A | 4/2015 |
| CN | 105245502 A | 1/2016 |
| CN | 107104977 A | 8/2017 |
| CN | 108183791 A | 6/2018 |
| CN | 108364223 A | 8/2018 |
| CN | 109241016 A | 1/2019 |
| CN | 109255247 A | 1/2019 |
| CN | 109359470 A | 2/2019 |
| WO | 2016135738 A1 | 9/2016 |

OTHER PUBLICATIONS

First Search for Chinese Application No. 201810925187.4 dated Jan. 2, 2020.
First Office Action for Chinese Application No. 201810925187.4 dated Jan. 10, 2020.
Supplementary Search for Chinese Application No. 201810925187.4 dated Feb. 11, 2020.
Second Office Action for Chinese Application No. 201810925187.4 dated Feb. 17, 2020.
Third Office Action for Chinese Application No. 201810925187.4 dated Apr. 13, 2020.
Written Opinion of the International Searching Authority and International Search Report for PCT Application No. PCT/CN2019/092340 dated Sep. 19, 2019.
International Preliminary Report on Patentability Chapter I for PCT Application No. PCT/CN2019/092340 dated Feb. 25, 2021.

* cited by examiner

MULTIPARTY SECURE COMPUTING METHOD, DEVICE, AND ELECTRONIC DEVICE

CROSS-REFERENCE TO RELATED APPLICATIONS

This application is a continuation application of International Patent Application No. PCT/CN2019/092340, filed on Jun. 21, 2019, which is based on and claims priority of the Chinese Patent Application No.: 201810925187.4, filed on Aug. 14, 2018. The above-referenced applications are incorporated herein by reference in their entirety.

TECHNICAL FIELD

One or more embodiments of this specification relate to the field of distributed computing, and in particular, to a secure multi-party computation method and apparatus, and an electronic device.

BACKGROUND

Secure multi-party computation is a cryptography technology. Multiple parties participating in a secure computation may, by executing a secure multi-party computation algorithm, jointly perform the secure computation based on respectively held private data to obtain a computation result without disclosing each party's private data to other parties.

Although the secure multi-party computation algorithm is designed to protect the privacy of each party's private data, an erroneous or malicious algorithm implementation may cause a breach on the private data. In an ideal scenario, the parties may each develop its own secure multi-party computation software and use it to participate in the secure multi-party computation. However, in actual applications, secure multi-party computation software used by the parties may usually be provided a same provider, and therefore it is imperative for the provider to show that the secure multi-party computation software it provides is trustworthy and there is no risk of data breach.

SUMMARY

This specification provides a secure multi-party computation method, applicable to any one computing node deployed in a distributed network, a plurality of computing nodes being deployed in the distributed network, the plurality of computing nodes jointly participating in a secure multi-party computation based on respectively held private data, the computing node being connected to a trusted key source.

The method may include: obtaining a trusted key from the trusted key source; encrypting the held private data based on the obtained trusted key to obtain ciphertext data; and transmitting at least the ciphertext data as a computing parameter to other computing nodes participating in the secure multi-party computation for the other computing nodes to perform the secure multi-party computation based on collected computing parameters transmitted by the computing nodes participating in the secure multi-party computation.

Optionally, the method may further include: creating an audit log corresponding to the ciphertext data transmitted by the computing node to the other computing nodes, the audit log recording description information related to the ciphertext data.

Optionally, the method may further include: collecting computing parameters transmitted by the other computing nodes participating in the secure multi-party computation, the computing parameters at least including ciphertext data obtained by encrypting the held private data by the other computing nodes; performing the secure multi-party computation based on the collected computing parameters; and creating an audit log corresponding to the ciphertext data transmitted by the other computing nodes, the audit log including description information related to the encrypted private data.

Optionally, the method may further include: performing, based on the audit log, a privacy audit on the ciphertext data transmitted by the computing node participating in the secure multi-party computation, to determine whether the ciphertext data transmitted as a computing parameter by the computing node is at a risk of privacy leakage; or transmitting the audit log to a third-party audit node for the audit node to perform a privacy audit on the ciphertext data transmitted as a computing parameter by the computing node participating in the secure multi-party computation, to determine whether the ciphertext data transmitted as a computing parameter by the computing node is at a risk of privacy leakage.

Optionally, the description information related to the ciphertext data may include an encryption key corresponding to the ciphertext data; and the performing, based on the audit log, a privacy audit on the ciphertext data transmitted by the computing node participating in the secure multi-party computation, to determine whether the ciphertext data transmitted as a computing parameter by the computing node is at a risk of privacy leakage may include: verifying whether the encryption key that is recorded in the audit log and corresponds to the ciphertext data transmitted by the computing node participating in the secure multi-party computation matches the trusted key from the trusted key source; and if it does, determining that the ciphertext data transmitted as the computing parameter by the computing node is not at the risk of privacy leakage; or if it does not, determining that the ciphertext data transmitted as the computing parameter by the computing node is at the risk of privacy leakage.

Optionally, a decryption key corresponding to the ciphertext data and cleartext data corresponding to the ciphertext data may be further recorded in the audit log corresponding to the ciphertext data transmitted by the computing node to the other computing nodes. And the method may further include: decrypting, based on the decryption key that is recorded in the audit log and corresponds to the ciphertext data transmitted by the computing node participating in the secure multi-party computation, the ciphertext data to obtain cleartext data; verifying whether the decrypted cleartext data matches the cleartext data that is recorded in the audit log and corresponds to the ciphertext data; and if it does, determining that the ciphertext data transmitted as the computing parameter by the computing node is not at the risk of privacy leakage; or if it does not, determining that the ciphertext data transmitted as the computing parameter by the computing node is at the risk of privacy leakage.

Optionally, the trusted key may be a random number. And the obtaining a trusted key from the trusted key source may include any one of the following: obtaining a random number generated by the trusted key source as the trusted key; obtaining a random number generated by the trusted key source, and using a result obtained by further performing an operation on the random number generated by the trusted key source and a random number generated by the computing node as the trusted key; obtaining a random number generated by the trusted key source, and using a random number calculated by inputting the random number into a key generation function as the trusted key; and obtaining a random number generated by the trusted key source, and using a result obtained by further performing an operation on a random number calculated by inputting the random number into a key generation function and a random number generated by the computing node as the trusted key.

This specification further provides a secure multi-party computation apparatus, applicable to any one computing node deployed in a distributed network, a plurality of computing nodes being deployed in the distributed network, the plurality of computing nodes jointly participating in a secure multi-party computation based on respectively held private data, the computing node being connected to a trusted key source.

The apparatus may include: an obtaining module, configured to obtain a trusted key from the trusted key source; an encryption module, configured to encrypt the held private data based on the obtained trusted key to obtain ciphertext data; and a transmission module, configured to transmit at least the ciphertext data as a computing parameter to other computing nodes participating in the secure multi-party computation for the other computing nodes to perform the secure multi-party computation based on collected computing parameters transmitted by the computing nodes participating in the secure multi-party computation.

Optionally, the apparatus may further include: a creation module, configured to create an audit log corresponding to the ciphertext data transmitted by the computing node to the other computing nodes, the audit log recording description information related to the ciphertext data.

Optionally, the apparatus may further include: a collection module, configured to collect computing parameters transmitted by the other computing nodes participating in the secure multi-party computation, the computing parameters at least including ciphertext data obtained by encrypting the held private data by the other computing nodes; and a computation module, configured to perform the secure multi-party computation based on the collected computing parameters.

The creation module may be further configured to: create an audit log corresponding to the ciphertext data transmitted by the other computing nodes, the audit log including description information related to the encrypted private data.

Optionally, the apparatus may further include: an audit module, configured to perform, based on the audit log, a privacy audit on the ciphertext data transmitted by the computing node participating in the secure multi-party computation, to determine whether the ciphertext data transmitted as a computing parameter by the computing node is at a risk of privacy leakage; or transmit the audit log to a third-party audit node for the audit node to perform a privacy audit on the ciphertext data transmitted as a computing parameter by the computing node participating in the secure multi-party computation, to determine whether the ciphertext data transmitted as a computing parameter by the computing node is at a risk of privacy leakage.

Optionally, the description information related to the ciphertext data may include an encryption key corresponding to the ciphertext data. And the audit module may be further configured to: verify whether the encryption key that is recorded in the audit log and corresponds to the ciphertext data transmitted by the computing node participating in the secure multi-party computation matches the trusted key from the trusted key source; and if it does, determine that the ciphertext data transmitted as the computing parameter by the computing node is not at the risk of privacy leakage; or if it does not, determine that the ciphertext data transmitted as the computing parameter by the computing node is at the risk of privacy leakage.

Optionally, a decryption key corresponding to the ciphertext data and cleartext data corresponding to the ciphertext data may be further recorded in the audit log corresponding to the ciphertext data transmitted by the computing node to the other computing nodes. And the audit module may be further configured to: decrypt, based on the decryption key that is recorded in the audit log and corresponds to the ciphertext data transmitted by the computing node participating in the secure multi-party computation, the ciphertext data to obtain cleartext data; verify whether the decrypted cleartext data matches the cleartext data that is recorded in the audit log and corresponds to the ciphertext data; and if it does, determine that the ciphertext data transmitted as the computing parameter by the computing node is not at the risk of privacy leakage; or if it does not, determine that the ciphertext data transmitted as the computing parameter by the computing node is at the risk of privacy leakage.

Optionally, the trusted key may be a random number. And to obtain a trusted key from the trusted key source, the obtaining module may be configured to do any one of the following: obtaining a random number generated by the trusted key source as the trusted key; obtaining a random number generated by the trusted key source, and using a result obtained by further performing an operation on the random number generated by the trusted key source and a random number generated by the computing node as the trusted key; obtaining a random number generated by the trusted key source, and using a random number calculated by inputting the random number into a key generation function as the trusted key; and obtaining a random number generated by the trusted key source, and using a result obtained by further performing an operation on a random number calculated by inputting the random number into a key generation function and a random number generated by the computing node as the trusted key.

This specification further provides an electronic device. The device may include: a processor; and a memory configured to store machine-executable instructions.

By reading and executing the machine-executable instructions stored in the memory and corresponding to control logic of secure multi-party computation, the processor may be configured to: obtain a trusted key from the trusted key source; encrypt the held private data based on the obtained trusted key to obtain ciphertext data; and transmit at least the ciphertext data as a computing parameter to other computing nodes participating in the secure multi-party computation for the other computing nodes to perform the secure multi-party computation based on collected computing parameters transmitted by the computing nodes participating in the secure multi-party computation.

This specification further provides a secure multi-party computation method, applicable to one computing node of a plurality of computing nodes deployed in a distributed network. The plurality of computing nodes may jointly participate in a secure multi-party computation based on data held on each of the plurality of computing nodes, and the one computing node may be coupled to a trusted key source.

The method may include: obtaining, by the one computing node, a trusted key from the trusted key source; encrypting, by the one computing node and based on the trusted key, the data held by the one computing node to obtain ciphertext data; and transmitting, by the one computing node, a computing parameter comprising at least the ciphertext data to other computing nodes of the plurality of computing nodes for the other computing nodes to perform the secure multi-party computation based on computing parameter.

This specification further provides a secure multi-party computation apparatus. The apparatus may include a processor and a non-transitory computer-readable memory coupled to the processor, and configured with instructions executable by the processor to perform operations.

The operations may include obtaining, by one computing node of a plurality of computing nodes, a trusted key from a trusted key source coupled to the one computing node, wherein the plurality of computing nodes deployed in a distributed network and jointly participating in a secure multi-party computation based on data held on each of the plurality of computing nodes; encrypting, by the one computing node and based on the trusted key, the data held by the one computing node to obtain ciphertext data; and transmitting, by the one computing node, a computing parameter comprising at least the ciphertext data to other computing nodes of the plurality of computing nodes for the other computing nodes to perform the secure multi-party computation based on computing parameter.

This specification further provides a non-transitory computer-readable storage medium having instructions stored thereon executable by a processor to cause the processor to perform any one of the aforementioned secure multi-party computation methods.

According to the foregoing technical solution, for the computing nodes participating in the secure multi-party computation, each computing node may obtain a trusted key from the connected trusted key source, encrypt the private data held by the computing node based on the obtained trusted key to obtain ciphertext data, and then transmit a computing parameter comprising at least the ciphertext data to other computing nodes participating in the secure multi-party computation to perform the secure multi-party computation. In this way, while performing encrypted computation on the private data held by one computing node, the computing node may no longer need to generated a key locally by using a carried secure multi-party computation algorithm. Instead, the computing node may obtain a trusted key from a connected trusted key source, so that the risk of privacy leakage, which may be caused by using a key constructed by a malicious secure multi-party computation algorithm based on the private data held by the computing node to encrypt the private data, can be avoided.

DETAIL DESCRIPTION OF THE EMBODIMENTS

For a computing node carrying secure multi-party computation algorithms such as a homomorphic encryption algorithm and a garbled circuit algorithm, one or more random numbers may be generated, based on carried randomized algorithms, as random keys. The generated random keys may be used to perform encrypted computation on private data held by the computing node to obtain ciphertext data, and the computed ciphertext data may then be transmitted as a computing parameter to other computing nodes participating in a secure multi-party computation.

However, in actual applications, a malicious secure multi-party computation algorithm may exploit a known key held by other computing nodes participating in the secure multi-party computation to encrypt the private data held by a computing node to generate ciphertext data. Then, when other computing nodes participating in the secure multi-party computation receive the ciphertext data transmitted to them, they may decrypt the ciphertext data based on the known key they held to obtain the private data, leading to a breach of the private data.

In view of the aforementioned limitations, this specification provides a technical solution of encrypting private data held by a computing node based on a trusted key from a trusted key source, which prevents data breach that may be caused by encrypting the private data based on a known key held by other computing nodes participating in the secure multi-party computation.

In actual implementations, computing nodes in a distributed network may each, in addition to carrying a secure multi-party computation algorithm provided by a provider, be further connected to a trusted key source respectively. The foregoing trusted key sources may be key sources independently developed by operators of the computing nodes or may be key sources developed by a trusted third party other than the foregoing provider.

When a computing node participates in a secure multi-party computation based on its private data, the computing node may obtain a trusted key from the connected trusted key source, encrypt the private data based on the trusted key to obtain ciphertext data, and then transmit a computing parameter comprising at least the ciphertext data to other computing nodes participating in the secure multi-party computation in the distributed network, so that the other computing nodes may perform the secure multi-party computation based on collected computing parameters transmitted by other computing nodes participating in the secure multi-party computation.

According to the foregoing technical solution, the computing nodes participating in the secure multi-party computation may each obtain a trusted key from a connected trusted key source, encrypt the private data it held based on the obtained trusted key to obtain ciphertext data, and then transmit a computing parameter comprising at least the ciphertext data to other computing nodes participating in the secure multi-party computation to perform the secure multi-party computation. In this way, while performing encrypted computation on the private data, the computing node may no longer need to use a key generated locally by using a carried secure multi-party computation algorithm. Instead, the computing node may use the trusted key obtained from the connected trusted key source to perform encrypted computation, thereby preventing data breach that may be caused by a malicious secure multi-party computation algorithm constructing a key based on its private data, and transmitting the key as a computing parameter to other computing nodes.

This specification is described below with reference to specific embodiments and specific application scenarios.

Figure 1:
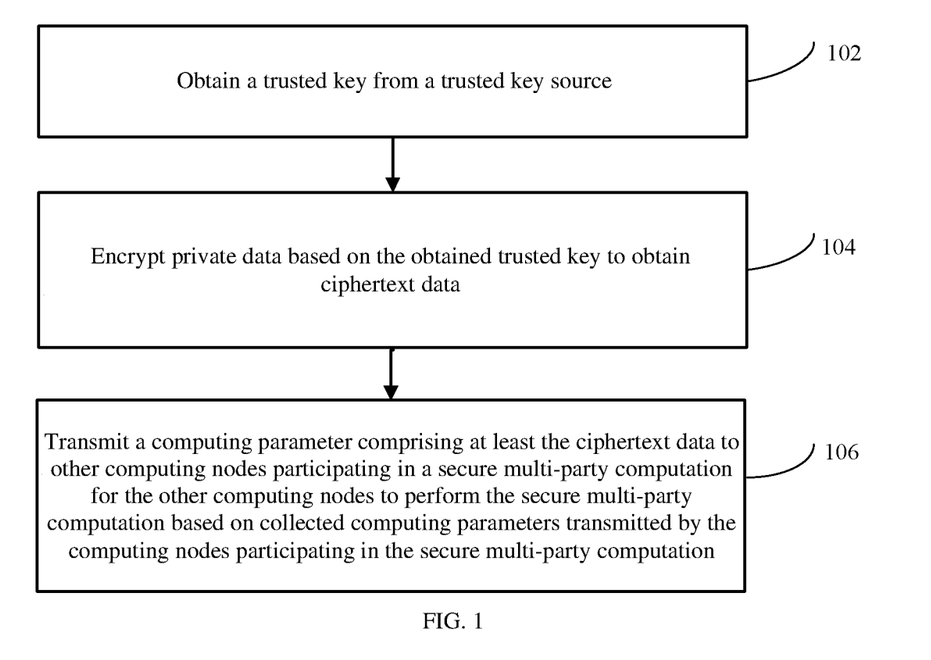
FIG. 1 is a flowchart of a secure multi-party computation method according to an embodiment.

FIG. 1 shows a secure multi-party computation method according to an embodiment of this specification.

The secure multi-party computation method is applicable to any one computing node of a plurality of computing nodes deployed in a distributed network. The plurality of computing nodes may jointly participate in a secure multi-party computation based on private data respectively held by each computing node. The computing nodes deployed in the distributed network may each be connected to a trusted key source. The secure multi-party computation method may the following steps S102 through S106.

Referring to FIG. 1, in step 102, one computing node of the plurality of the computing nodes may obtain a trusted key from a trusted key source.

In step 104, the one computing node may encrypt the private data it held based on the obtained trusted key to obtain ciphertext data.

In step 106, the one computing node may transmit a computing parameter comprising at least the ciphertext data as a computing parameter to other computing nodes participating in the secure multi-party computation for the other computing nodes to perform the secure multi-party computation based on collected computing parameters transmitted by the computing nodes participating in the secure multi-party computation.

The distributed network may include a data network in any form that can support secure multi-party computation and has a distributed architecture.

In one example, the distributed network may be a secure multi-party computation platform constructed by a device cluster (e.g., a server cluster) formed by a plurality of computing devices.

In another example, the distributed network may alternatively be a blockchain network formed by a plurality of node devices. That is, the computing nodes may be the node devices in the blockchain network. An online service may be deployed in the blockchain network. The online service may require the plurality of node devices to jointly participate in a secure multi-party computation based on private data held by the plurality of node devices, and it needs to be ensured that the private data held by each node device is not disclosable to other node devices. A specific type of the online service is not specifically limited in this specification.

The computing node may include a node device that can carry the secure multi-party computation algorithm in the distributed network.

The secure multi-party computation algorithm may include secure multi-party computation algorithms that are independently developed by the computing nodes or centrally provided by a provider. For example, in actual applications, the secure multi-party computation algorithm may correspond to secure multi-party computation software independently developed by the computing nodes or centrally provided by a provider.

The computing parameters may be generated by the computing nodes participating in the secure multi-party computation based on the carried secure multi-party computation algorithms and may be related to the private data held by the computing nodes. The computing nodes may need to transmit generated computing parameters to each other through an exchange message, and may perform the secure multi-party computation based on the collected computing parameters generated by the computing nodes.

In actual applications, the computing parameter may generally include random numbers needing to participate in a secure multi-party computation and/or ciphertext data needing to participate in a secure multi-party computation.

It should be noted that, in actual applications, the foregoing secure multi-party computation algorithm may include a secure multi-party computation algorithm such as a secret sharing algorithm, a homomorphic encryption algorithm, a garbled circuit algorithm. Specific content included in the computing parameters may depend on specific algorithm types of the secure multi-party computation algorithms carried by the computing nodes. The content of the computing parameters may be different for the node devices carrying the different algorithms listed above.

For example, for the secret sharing algorithm, the computing parameters may include N random numbers obtained by splitting the private data held by a computing node. The N random numbers may include N−1 independently generated random numbers, and the Nth random number may be an operation result obtained by performing an operation on the N−1 random numbers and the private data held by the computing node.

For the homomorphic encryption algorithm, the computing parameters may include ciphertext data obtained by encrypting the private data based on a key held by the computing node.

For the garbled circuit algorithm, the computing parameters may include random numbers used for respectively replacing an input value (i.e., input data participating in computation) and an output value of a garbled circuit (which may also be referred to as salt values of an input value and an output value), and ciphertext data obtained by encrypting the salt value of output data by using the salt value of the input value as a key.

The trusted key source may include key sources independently developed by operators of the computing nodes, or key sources provided by a trusted third party other than the foregoing provider. For example, in actual applications, the trusted key source may be a computer program (e.g., a trusted key generation algorithm or a trusted key generation function) independently developed by the operators of the computing nodes and used for generating a trusted key source, or may be a computer program developed by a trusted third party other than the provider and used for generating a trusted key source.

In this specification, the plurality of computing nodes may be deployed in a distributed network, as participants of the secure multi-party computation. The computing nodes may jointly carry the same type of secure multi-party computation algorithm to participate in the secure multi-party computation without disclosing the private data held by a computing node to other computing nodes.

For example, the computing nodes may jointly carry secure multi-party computation software provided by the provider of the secure multi-party computation algorithm and perform message exchange by using the secure multi-party computation software to transmit ciphertext data participating in the secure multi-party computation between the computing nodes, to participate in the secure multi-party computation.

It should be noted that, in this specification, the secure multi-party computation algorithm carried in the computing nodes may be an algorithm that supports transmission of the ciphertext data, which is obtained by encrypting the private data based on a key, as a computing parameter to other computing nodes participating in the secure multi-party computation. The secure multi-party computation algorithm may be a homomorphic encryption algorithm or a garbled circuit algorithm.

In addition to jointly carrying the same type of secure multi-party computation algorithm, an independent trusted key source, an independent data source, a result storage system, and a log storage system may further be separately deployed in the computing nodes deployed in the distributed network.

The trusted key source may be used for generating a random trusted key.

The data source may be used for storing and maintaining private data held by data nodes (i.e., computing nodes).

The result storage system is used for storing and maintaining a computation result obtained by participating in a secure multi-party computation by the data nodes.

It should be noted that, in actual applications, the trusted key source may alternatively be, for example, a key source provided by a trusted third party other than the provider of the secure multi-party computation algorithm. In this case, a trusted key source may not necessarily be deployed locally in the computing nodes. Instead, a third-party trusted key source may be directly connected to the computing nodes to obtain a trusted key source used for encrypting the private data held by the computing node.

In addition, in some secure multi-party computation that only involves a small amount of data, it may not be necessary to deploy an independent data source and a result storage system in the node devices. In this case, the computing nodes may directly obtain data inputted by a user through an operation interface as the data source, and output a final computation result of the secure multi-party computation to the user through the operation interface.

The log storage system may be used for storing and maintaining audit logs created by the data nodes and related to the computing parameters.

It should be noted that, the created audit logs may alternatively be stored in a third-party storage device or storage system. In this case, it may not be necessary to deploy an independent log storage system locally in the computing nodes. That is, in actual applications, a generation node and a storage node of an audit log may be the same or different, which is not specifically limited in this specification.

For any target computing node participating in the secure multi-party computation, when jointly completing the secure multi-party computation with other computing nodes, the target computing node may first read private data that is needed to participate in the secure multi-party computation from deployed data sources, and obtain a trusted key from the trusted key source.

The target computing node may then perform encrypted computation on the private data based on the obtained trusted key to generate ciphertext data corresponding to the private data.

It should be noted that the trusted key generated by the trusted key source may be a random number generated based on a key generation function.

In some embodiments, when obtaining a trusted key from a trusted key source, the target computing node may directly obtain a random number generated by the trusted key source as the trusted key. Alternatively, the target computing node may only obtain a root random number used for generating a random number from the trusted key source (i.e., a random number seed used for generating a random number), perform computation locally by inputting the root random number into a key generation function, and then use a computed random number as the trusted key.

In some embodiments, when obtaining a trusted key from a trusted key source, the target computing node may alternatively use a result obtained by performing an operation on a random number obtained from the trusted key source and a random number generated locally based on a carried key generation function as the trusted key. The target computing node may alternatively use a result obtained by further performing an operation on a random number generated by inputting a random number obtained from the trusted key source into a key generation function for computation and a random number generated locally based on a carried random number generation function (i.e., using a random number seed generated locally to compute a random number) as the trusted key.

After the target computing node performs encrypted computation on the received private data based on the obtained trusted key to generate ciphertext data corresponding to the private data, the target computing node may construct an exchange message based on the carried secure multi-party computation algorithm and an existing message exchange mechanism, to transmit a computing parameter comprising at least the generated ciphertext data to other computing nodes participating in the secure multi-party computation.

The other computing nodes may collect computing parameters transmitted, through the exchange messages, by the computing nodes participating in the secure multi-party computation, perform the secure multi-party computation based on the collected computing parameters, and store the computation result in the result storage system deployed locally.

Correspondingly, the target computing node may alternatively collect computing parameters transmitted, through the exchange messages, by the computing nodes participating in the secure multi-party computation, perform the secure multi-party computation based on the collected computing parameters, and store the computation result in the result storage system deployed locally.

It should be noted that a computation process in which the computing nodes participating in the secure multi-party computation perform the secure multi-party computation based on the collected computing parameters may depend on a specific algorithm type of the secure multi-party computation algorithm carried in the computing nodes. Generally, computation processes involved in different types of secure multi-party computation algorithms may be different.

A brief description of algorithm logic of various algorithms listed above is present below using examples in which the secure multi-party computation algorithms carried in the computing nodes are the homomorphic encryption algorithm and the garbled circuit algorithm, respectively.

1. Homomorphic Encryption Algorithm

The homomorphic encryption algorithm is a type of encryption algorithm that can perform data operation in a ciphertext state. A ciphertext of the computation result obtained by performing computation based on a cleartext may also be obtained by performing computation on the ciphertext without decryption and the use of a decryption key.

For example, an operation may be performed on a homomorphic ciphertext $E(a)$ of a and a homomorphic ciphertext $E(b)$ of b to obtain a ciphertext $E(a+b)$ of a+b. a, b or a+b will not be disclosed in the operation process, and a decryption key does not need to be used for decrypting the ciphertext.

If the secure multi-party computation algorithm carried in the computing nodes deployed in the distributed network is the homomorphic encryption algorithm, after the target computing node reads private data S, which is needed to participate in the secure multi-party computation from a deployed data source, based on existing computation logic of the homomorphic encryption algorithm, a pair of encryption key PK and decryption key SK for homomorphic encryption may be generated based on the homomorphic encryption algorithm.

In this specification, the encryption key PK and the decryption key SK may no longer need to be generated according to the homomorphic encryption algorithm.

Instead, they may be generated by a trusted key source deployed locally in the computing node.

In this case, the target computing node may obtain the encryption key PK and the decryption key SK as trusted keys from a trusted key source deployed locally, encrypt the private data based on the encryption key PK to generate ciphertext data, then construct an exchange message based on an existing message exchange mechanism of the homomorphic encryption algorithm, and respectively transmit the generated ciphertext data to other computing nodes participating in the secure multi-party computation.

According to one aspect, the other computing nodes may also use the same mode described above to obtain a pair of encryption key PK and decryption key SK for homomorphic encryption as trusted keys from a deployed trusted key source. The other computing nodes then may encrypt private data read from a locally deployed data source based on the encryption key PK to obtain ciphertext data, collect ciphertext data transmitted by the computing nodes and generated by encrypting the private data held by the computing nodes, and perform computation on collected ciphertext data transmitted by the other computing nodes and the ciphertext data generated locally together according to an appointed operation logic, to obtain ciphertext data corresponding to a final computation result obtained by performing a secure multi-party computation on the private data held by the computing nodes (the ciphertext data cannot be decrypted locally by the other computing nodes).

After the ciphertext data corresponding to the final computation result is obtained, the other computing nodes may broadcast the ciphertext data corresponding to the final computation result to node devices. After the target computing node receives the ciphertext data corresponding to the final computation result, the target computing node may decrypt the received ciphertext data corresponding to the final computation result based on the decryption key SK, to obtain cleartext data of the final computation result, and then store the cleartext data of the final computation result in the result storage system deployed locally.

According to another aspect, the target computing node may alternatively collect the ciphertext data transmitted by the other computing nodes and obtained by encrypting the private data respectively held by the other computing nodes, and perform computation on the collected ciphertext data transmitted by the other computing nodes and the ciphertext data generated locally together according to the appointed operation logic, to obtain ciphertext data corresponding to the final computation result obtained by performing a secure multi-party computation on the private data held by the computing nodes (the ciphertext data cannot be decrypted locally by the target computing node).

After the ciphertext data corresponding to the final computation result is obtained, the target computing node may broadcast the ciphertext data corresponding to the final computation result to the other computing nodes. After the other computing nodes receive the ciphertext data corresponding to the final computation result, the other computing nodes may decrypt the received ciphertext data corresponding to the final computation result based on the decryption key SK, to obtain cleartext data of the final computation result, and then store the cleartext data of the final computation result in the result storage system deployed locally.

It should be noted that, the operation logic appointed by the computing nodes may still depend on an actual secure multi-party computation requirement, and this is not specifically limited in this specification. However, any operation logic may be decomposed into basic operations such as additive homomorphic encryption and multiplicative homomorphic encryption based on the homomorphic encryption algorithm.

2. Garbled Circuit Algorithm

A principle of the garbled circuit algorithm is to simulate an application-specific integrated circuit (ASIC) by using a computer to implement secure multi-party computation. Any secure multi-party computation task may be implemented by the ASIC designed for the task. That is, a gate circuit corresponding to the operation logic may be simulated by connecting a plurality of operation gates (e.g., basic operation gates such as AND gates and XOR gates) according to the operation logic corresponding to the secure multi-party computation task, and an operation then may be performed by using the gate circuit.

Based on the garbled circuit algorithm, the operation logic corresponding to the secure multi-party computation task may be represented as a gate circuit, each operation path of the gate circuit may then be encrypted, and the encrypted gate circuit may be referred to as a garbled circuit. Secure multi-party computation may be implemented by performing an operation of the garbled circuit using a computer.

When secure multi-party computation is implemented based on the garbled circuit algorithm, computing nodes participating in the secure multi-party computation may be classified into two roles, namely, a generation party of the garbled circuit and an execution party of the garbled circuit.

For example, in one secure multi-party computation in which K computing nodes participate, K–1 computing nodes may be used as the generation party of a circuit to generate a garbled circuit, and one remaining computing node may be used as the execution party of the garbled circuit to perform an operation on the garbled circuit to obtain a final computation result.

If the secure multi-party computation algorithm carried in the computing nodes deployed in the distributed network is the garbled circuit algorithm, the operation logic corresponding to the secure multi-party computation task may first be represented as a gate circuit.

The operation logic requires that the plurality of computing nodes to jointly participate based on the private data respectively held in the computing nodes. One computing node may only correspond to one or more operation gates in the gate circuit, and the private data held by the computing node may only be used as input data of one or more operation gates in the gate circuit.

Further, after the target computing node reads the private data S that is needed to participate in the secure multi-party computation from a deployed data source, the target computing node may use the received private data S as an input value of a corresponding operation gate in the gate circuit to perform an operation in the operation gate to obtain an output value of the operation gate.

In actual applications, the operation logic of each operation gate in the gate circuit may be represented and performed by using a truth table. One truth table may be used for recording an output value obtained by an output path when any value is inputted into an input path of the operation gate. Each row in the truth table may correspond to one input value combination of the input path. To hide true values of the operation paths in the operation gate in the operation of the gate circuit, according to one aspect, the target computing node may, based on existing operation logic of the garbled circuit algorithm, generate random numbers locally based on a random function carried in the garbled circuit algorithm, to replace the input values and the output values in the truth table of the operation gate. The random numbers obtained after the replacement may be referred to as salt values.

In this specification, the random numbers used for replacing the input values and the output values in the truth table of the operation gate may not necessarily be generated locally by the random function carried in the garbled circuit algorithm. Instead, they may be generated by a trusted key source deployed locally by the computing node.

In this case, the target computing node may obtain random numbers from the trusted key source, and replace the input values and the output values in the truth table based on the obtained random numbers.

According to another aspect, the target computing node may alternatively use the salt values corresponding to the input values of the operation gate as a key to encrypt the salt values of the output values in the truth table of the operation gate to obtain ciphertext data. The target computing node may replace the salt values of the output values in the original truth table based on the ciphertext data to obtain a garbled truth table. Alternatively, the target computing node may independently create a garbled truth table based on the ciphertext data (i.e., the garbled truth table only includes the ciphertext data).

According to a third aspect, the target computing node may alternatively shuffle a sequence of each row in the garbled truth table.

Upon the completion of the garbled replacement for the truth table of the corresponding operation gate in the gate circuit by the target computing node completes in the foregoing aspects, the garbled circuit may be generated. The target computing node may construct an exchange message based on an existing message exchange mechanism of the garbled circuit. The target computing node may use the salt values corresponding to the input values of the corresponding operation gate in the gate circuit and the salt values corresponding to the input values of the operation gate as a key, and use the ciphertext data obtained by encrypting the salt values of the output values in the truth table of the operation gate as a computing parameter, to transmit the key and the computing parameter to the computing node serving as the execution party of the garbled circuit.

For example, in actual applications, when secure multi-party computation is implemented based on the garbled circuit algorithm, the garbled circuit algorithm and the oblivious transfer technology may be combined. When the target computing node transmits the computing parameter to the computing node serving as the execution party of the garbled circuit, on one hand, the target computing node may generally directly transmit the garbled truth table, in the form of a cleartext, to the computing node used as the execution party of the garbled circuit. On the other hand, the oblivious transfer technology may be used to transmit, in a blurring transmission manner, the salt values corresponding to the input values of the operation gate corresponding to the target computing node in the gate circuit to the computing node serving as the execution party of the garbled circuit.

A specific implementation process of transmitting data to the computing node serving as the execution party of the garbled circuit based on the oblivious transfer technology will not be repeatedly described in detail in this specification. When a person skilled in the art implements the technical solution of this specification, reference may be made to the record in the related art.

After receiving the computing parameters transmitted by the computing nodes, the computing node serving as the execution party of the garbled circuit may perform decryption on the ciphertext data recorded in the garbled truth table of the operation gates corresponding to the computing nodes in the gate circuit according to the salt values corresponding to the input values of the operation gates corresponding to the computing nodes in the gate circuit to obtain the salt values of the output values of the operation gates corresponding to the computing nodes in the gate circuit.

Eventually, the computing node serving as the execution party of the garbled circuit may perform an operation grade by grade based on the decrypted salt values of the output values of the operation gates in the gate circuit to obtain a salt value corresponding to a final output value of the gate circuit, and then transmit the salt value as the final computation result to other computing nodes.

After receiving the salt value corresponding to the final output value of the gate circuit, the target computing node may query the truth table to obtain an output value corresponding to the salt value based on a correspondence between a salt value and a true output value, and store the output value as an original value of a final computation result of the secure multi-party computation in the result storage system deployed locally.

For the computing nodes deployed in the distributed network, when the secure multi-party computation process shown above is completed, the computing nodes may perform visual output on the computation result stored in the result storage system to administrative users of the computing nodes.

In this specification, an exchange message carrying a large number of ciphertexts may be transmitted between computing nodes carrying secure multi-party computation algorithms such as the homomorphic encryption algorithm and the garbled circuit algorithm. Even for a user of the secure multi-party computation algorithm, it is generally difficult to understand the specific meanings of the ciphertexts carried in the exchange message.

Based on this, in this specification, when a target node device transmits, by constructing an exchange message based on the existing message exchange mechanism of the carried secure multi-party computation algorithm, the generated ciphertext data as a computing parameter to computing nodes participating in the secure multi-party computation, the target node device may further locally create an audit log related to the transmitted ciphertext data, and store the created audit log in a log storage system deployed locally.

The audit log may be, for example, used for recording description information related to the ciphertext data transmitted by the computing nodes participating in the secure multi-party computation.

In some embodiments, the computing parameter that the computing node needs to transmit to other computing nodes participating in the secure multi-party computation may be included in a message field in the exchange message constructed by the computing node. Therefore, the specific meaning of each field and description information related to each field in the exchange message constructed by the computing node may be recorded in the audit log for auditing.

Correspondingly, when the target node device receives the computing parameters transmitted by the other computing nodes through the constructed exchange message and comprising at least the ciphertext data obtained by encrypting the private data held by other computing nodes, the target node device may further locally create an audit log related to the ciphertext data transmitted by the other computing nodes, and store the created audit log in the log storage system deployed locally.

For example, the computing nodes deployed in the distributed network may carry the same secure multi-party computation algorithm, so that the exchange message constructed by the computing nodes may conform to the same message format. Therefore, after receiving the exchange message transmitted by other computing nodes, the target computing node may parse the exchange message according to a standard message format to generate a corresponding audit log, and record the specific meaning of each field in the exchange message in the audit log.

In this specification, the description information related to the ciphertext data and recorded in the audit log may cover any form of description information capable of proving that the encryption key corresponding to the ciphertext data is the trusted key from the trusted key source. This is not specifically limited in this specification.

In some embodiments, the description information related to the ciphertext data and recorded in the audit log may include an encryption key corresponding to the ciphertext data. In this way, when a privacy audit is performed on the ciphertext data transmitted by the computing nodes based on the audit log stored in the log storage system, it may be directly audited whether the encryption key that is recorded in the audit log and corresponds to the ciphertext data is the trusted key from the trusted key source, to determine whether the ciphertext data is at the risk of privacy leakage.

In some embodiments, in addition to the encryption key, the audit log may further carry a decryption key used for decrypting the ciphertext data; and the audit log may carry cleartext data of the ciphertext data.

For example, the description information related to the ciphertext data and recorded in the audit log created by the computing node and related to the ciphertext data transmitted locally to other computing nodes may be different from the description information related to the ciphertext data and recorded in the audit log created by the computing node and related to the received ciphertext data transmitted by the other computing nodes.

For the secure multi-party computation nodes, input data used by each computing node may need to be kept confidential from other computing nodes participating in the secure multi-party computation. Therefore, the audit log created by the computing node and related to the ciphertext data transmitted by the other computing nodes may only record the encryption key related to the ciphertext data. The audit log created by the computing node and related to the computing parameter transmitted locally to the other computing nodes may further record the decryption key of the ciphertext data and the cleartext data of the ciphertext data in addition to the encryption key of the ciphertext data.

In this way, an administrative user of the computing node may further verify, after the ciphertext data generated locally as a computing parameter by the computing node is decrypted based on the decryption key recorded in the audit log, whether decrypted cleartext data is consistent with the cleartext data of the computing parameter recorded in the audit log (i.e., original cleartext data), and audit whether the secure multi-party computation algorithm carried in the computing node maliciously adds private data to the transmitted ciphertext data without the user's consent, thereby improving the auditability of the algorithm.

In this specification, the computing nodes deployed in the distributed network may jointly use a secure multi-party algorithm provided by a provider of secure multi-party computation algorithms. Although the secure multi-party algorithm is an algorithm designed for protecting private data, an erroneous or malicious algorithm implementation may cause a breach of private data.

For example, in a scenario, a malicious secure multi-party computation algorithm may use a known key of other parties to encrypt private data that is needed to be transmitted to other computing nodes without a user's consent, and thus allow a receiver to obtain the private data held by the other computing nodes by using the known key to decrypt the data.

In this specification, the computing nodes deployed in the distributed network may perform a privacy audit on the secure multi-party algorithm carried in the computing nodes based on the audit log stored in the log storage system (or may only perform a privacy audit on the secure multi-party algorithm carried in this node or the secure multi-party algorithm carried in a specified computing node in the computing nodes) to determine whether the ciphertext data transmitted by the computing nodes contains a privacy risk. In this specification, a "privacy risk" may refer to a risk of private data held by a computing node being inadvertently disclosed to unauthorized parties (i.e., a data breach of the private data).

Certainly, in actual applications, the privacy audit on the secure multi-party algorithm carried in the computing nodes may be alternatively performed by a third-party audit node. In this case, the computing nodes deployed in the distributed network may transmit the audit log in the log storage system to the audit node (e.g., the computing node may actively transmit the audit log to the audit log, or the audit node may actively retrieve the audit log from the computing node), and the third-party audit node may perform, based on the received audit log, a privacy audit on the secure multi-party algorithm carried in the computing nodes to determine whether the computing parameters transmitted by the computing nodes contain a privacy risk.

In one example, the computing nodes may carry a secure multi-party computation algorithm provided by the provider, and audit nodes may be independently deployed by operators of the computing nodes. The audit nodes may be used for performing a privacy audit on the secure multi-party computation algorithm provided by the provider.

The audit logic of performing a privacy audit on the secure multi-party algorithm carried in the computing nodes may depend on specific content of the description information related to the ciphertext data and recorded in the audit log.

In some embodiments, the description information related to the ciphertext data and recorded in the audit log may include an encryption key corresponding to the ciphertext data.

In some embodiments, the computing node may read an audit log corresponding to the ciphertext data transmitted as a computing parameter by the computing node participating in the secure multi-party computation from a log storage system deployed locally, and verify, based on the encryption key that is recorded in the read audit log and corresponds to the ciphertext data, whether the encryption key matches a trusted key from a deployed trusted key source.

For example, in actual applications, when a trusted key source generates a random number as a trusted key, a random number may be extracted as a trusted key from a preset random number value space in a random extraction manner. Therefore, for verifying whether the encryption key that is recorded in the audit log and corresponds to the ciphertext data matches a trusted key from a deployed trusted key source, this process may be, for example, matching the value of a random number used as the encryption key against the random number value space, to determine whether the value of the random number of the encryption key is within a value range of the random number value space. If it does, it indicates that the value of the random number of the encryption key is a random number extracted from the value range of the random number value space, and the encryption key is a trusted key from a trusted key source in this case. Otherwise, it indicates that the value of the random number of the encryption key is not a random number extracted from the value range of the random number value space, and the encryption key may not be a trusted key from a trusted key source in this case.

If it is determined through verification that the encryption key corresponding to the ciphertext data is a trusted key from a trusted key source, the encryption key corresponding to the ciphertext data is not a known key held by other computing nodes, and in this case, the ciphertext data does not contain a privacy risk. Otherwise, if it is determined through verification that the encryption key corresponding to the ciphertext data is not a trusted key from a trusted key source, the encryption key corresponding to the ciphertext data may be a known key held by other computing nodes, and in this case, the ciphertext data contains a privacy risk.

In this way, the computing node may determine whether the key corresponding to the ciphertext data used as a computing parameter is a trusted key from a trusted key source by performing a simple audit on the audit log in the log storage system deployed locally, so that the privacy risk can be identified in time.

In some scenarios, if the audit log further carries a decryption key used for decrypting the ciphertext data and cleartext data of the ciphertext data in addition to the encryption key, the computing node may further perform a security verification on the ciphertext data based on the decryption key corresponding to the ciphertext data and the cleartext data of the ciphertext data that are recorded in the read audit log, to determine whether private data is maliciously added to the ciphertext data by a carried secure multi-party computation algorithm.

For example, in some embodiments, after the ciphertext data generated locally as a computing parameter by the computing node is decrypted based on the decryption key recorded in the audit log, the computing node may further verify whether the decrypted cleartext data of the computing parameter is consistent with the cleartext data of the computing parameter recorded in the audit log (i.e., original cleartext data), and determine whether the secure multi-party computation algorithm carried in the computing node maliciously adds private data to the ciphertext data transmitted as a computing parameter without the user's consent. If they are consistent, it indicates that the implementation logic of the secure multi-party computation algorithm that is carried in the computing node and is provided by a provider is the same as the design of the secure multi-party computation algorithm, and the ciphertext data does not contain a privacy risk. If they are not consistent, it indicates that the secure multi-party computation algorithm that is carried in the computing node and is provided by an algorithm provider may maliciously add private data to the transmitted computing parameter without the user's knowledge, and in this case, the ciphertext data contains a privacy risk.

In this way, the computing node may determine, by performing a simple audit on the audit log in the log storage system deployed locally, whether private data is maliciously added to the ciphertext data serving as a computing parameter by a carried secure multi-party algorithm, so that the privacy risk can be identified in time.

According to the foregoing technical solution, a computing node participating in the secure multi-party computation may obtain a trusted key from a connected trusted key source, encrypt the private data held by the computing node based on the obtained trusted key to obtain ciphertext data, and then transmit a computing parameter comprising at least the ciphertext data to other computing nodes participating in the secure multi-party computation to perform the secure multi-party computation. In this way, while performing encrypted computation on the private data held by the computing node, the computing node may not necessarily use a key generated locally by a carried secure multi-party computation algorithm. Instead, the computing node may use the trusted key obtained from the connected trusted key source, so that the privacy risk caused by constructing a key according to a malicious secure multi-party computation algorithm based on the private data to encrypt the private data can be prevented.

Figure 2:
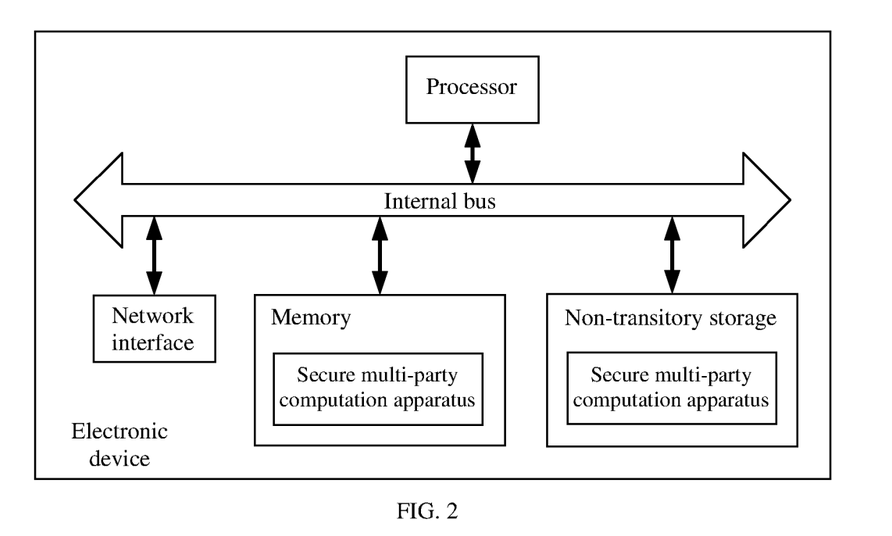
FIG. 2 is a schematic structural diagram of an electronic device according to an embodiment.

Corresponding to the foregoing method embodiments, this specification further provides an embodiment of a secure multi-party computation apparatus. The embodiment of the secure multi-party computation apparatus in this specification may be applicable to an electronic device. The apparatus embodiment may be implemented by software, or by hardware or a combination of software and hardware. Using a software implementation as an example, as a logical apparatus, the apparatus may be formed by reading corresponding computer program instructions from a non-transitory storage into a memory by a processor of an electronic device where the apparatus is located. On a hardware level, as shown in FIG. 2, which is a hardware structural diagram of an electronic device in which a secure multi-party computation apparatus according to this specification is located, the electronic device in which the apparatus is located in the embodiment not only may include a processor, a memory, a network interface, and a non-transitory storage shown in FIG. 2, but may also include other hardware according to actual functions of the electronic device. Details will not be repeated herein.

Figure 3:
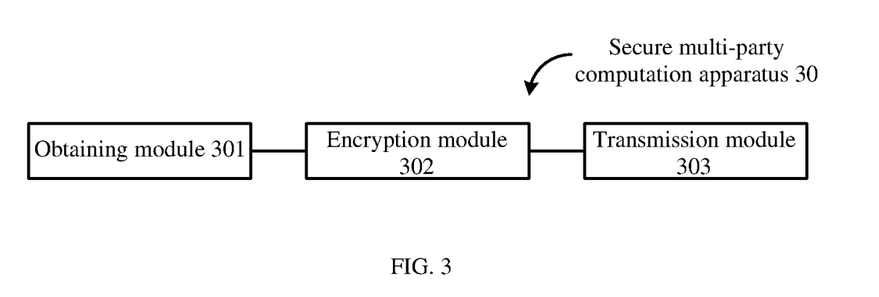
FIG. 3 is a block diagram of a secure multi-party computation apparatus according to an embodiment.

FIG. 3 is a block diagram of a secure multi-party computation apparatus according to an embodiment of this specification.

Referring to FIG. 3, the secure multi-party computation apparatus 30 may be applicable to the electronic device shown in FIG. 2, and may include an obtaining module 301, an encryption module 302, and a transmission module 303.

The obtaining module 301 may be configured to obtain a trusted key from the trusted key source.

The encryption module 302 may be configured to encrypt the private data based on the obtained trusted key to obtain ciphertext data.

The transmission module 303 may be configured to transmit a computing parameter comprising at least the ciphertext data to other computing nodes participating in the secure multi-party computation for the other computing nodes to perform the secure multi-party computation based on collected computing parameters transmitted by the computing nodes participating in the secure multi-party computation.

In this embodiment, the apparatus 30 may further include a creation module 304 (not shown in FIG. 3).

The creation module 304 may be configured to create an audit log corresponding to the ciphertext data transmitted by the computing node to the other computing nodes. The audit log may record description information related to the ciphertext data.

In this embodiment, the apparatus 30 further includes a collection module 305 (not shown in FIG. 3).

The collection module 305 may be configured to collect computing parameters transmitted by the other computing nodes participating in the secure multi-party computation. The computing parameters may include at least ciphertext data obtained by encrypting the private data held by the other computing nodes.

In this embodiment, the apparatus 30 may further includes an audit module 306 (not shown in FIG. 3).

The computation module 306 may be configured to perform the secure multi-party computation based on the collected computing parameters.

The creation module 304 may be further configured to: create an audit log corresponding to the ciphertext data transmitted by the other computing nodes. The audit log may include description information related to the encrypted private data.

In this embodiment, the apparatus 30 further includes an audit module 307.

The audit module 307 may be configured to perform, based on the audit log, a privacy audit on the ciphertext data transmitted by the computing node participating in the secure multi-party computation, to determine whether the ciphertext data transmitted as a computing parameter by the computing node contains a privacy risk; or transmit the audit log to a third-party audit node for the audit node to perform a privacy audit on the ciphertext data transmitted as a computing parameter by the computing node participating in the secure multi-party computation, to determine whether the ciphertext data transmitted as a computing parameter by the computing node contains a privacy risk.

In this embodiment, the description information related to the ciphertext data may include an encryption key corresponding to the ciphertext data.

The audit module 307 may be further configured to determine whether the encryption key that is recorded in the audit log and corresponds to the ciphertext data transmitted by the computing node participating in the secure multi-party computation matches the trusted key from the trusted key source.

If the encryption key matches the trusted key from the trusted source, the audit module 307 may determine that the ciphertext data transmitted as the computing parameter by the computing node does not contain a privacy risk. If the encryption key does not match the trusted key from the trusted source, the audit module 307 may determine that the ciphertext data transmitted as the computing parameter by the computing node contains a privacy risk.

In this embodiment, a decryption key corresponding to the ciphertext data and cleartext data corresponding to the ciphertext data may be further recorded in the audit log corresponding to the ciphertext data transmitted by the computing node to the other computing nodes.

The audit module 307 may be further configured to: decrypt, based on the decryption key that is recorded in the audit log and corresponds to the ciphertext data transmitted by the computing node participating in the secure multi-party computation, the ciphertext data to obtain decrypted cleartext data; verify whether the decrypted cleartext data matches the cleartext data that is recorded in the audit log and corresponds to the ciphertext data (i.e., original cleartext data).

If the decrypted cleartext data matches the original cleartext data, the audit module 307 may determine that the ciphertext data transmitted as the computing parameter by the computing node does not contain a privacy risk.

If the decrypted cleartext data does not match the original cleartext data, the audit module 307 may determine that the ciphertext data transmitted as the computing parameter by the computing node contains a privacy risk.

In this embodiment, the trusted key may be a random number, and the obtaining the trusted key from the trusted key source may include any one of the following: (a). obtaining an initial random number generated by the trusted key source, and using the initial random number as the trusted key; (b). obtaining an initial random number generated by the trusted key source, obtaining a computation random number generated by the computing node, and using a result obtained by further performing an operation on the initial random number and the computation random number as the trusted key; (c). obtaining an initial random number generated by the trusted key source, and obtaining a functional number by inputting the initial random number into a key generation function, and using the functional number as the trusted key; and (d). obtaining an initial random number generated by the trusted key source, obtaining a function number by inputting the initial random number into a key generation function, obtaining a computation random number generated by the computing node, and using a result obtained by further performing an operation on the computation random number and the functional random number as the trusted key.

The implementation processes of the corresponding steps in the foregoing method embodiments may be referred to for details about the implementation processes of the functions and effects of the modules in the foregoing apparatus, which are not described herein again.

The apparatus embodiments generally correspond to the method embodiments, and therefore partial or full descriptions in the method embodiments may be referred to for related parts. The described apparatus embodiments are merely examples. The modules described as separate parts may or may not be physically separate, and parts displayed as modules may or may not be physical modules, may be located in one position, or may be distributed on a plurality of network modules. A part or all of the modules may be selected according to actual requirements to achieve the objectives of the solutions of this specification. A person of ordinary skill in the art may understand and implement the solutions without creative efforts.

The system, apparatus, module, or unit described in the foregoing embodiment may be, for example, implemented by a computer chip or entity, or a product with a specified function. A typical implementation device is a computer, and a specific form of the computer may be a personal computer, a laptop computer, a cellular phone, a camera phone, a smartphone, a personal digital assistant, a media player, a navigation device, an email device, a game console, a tablet computer, a wearable device, or a combination of any of these devices.

Corresponding to the foregoing method embodiment, this specification further provides an embodiment of an electronic device. The electronic device includes a processor and a memory configured to store machine-executable instructions. The processor and the memory may be connected by an internal bus. In other possible implementations, the device may further include an external interface for communication with other devices or components.

In this embodiment, by reading and executing the machine-executable instructions stored in the memory and corresponding to control logic of secure multi-party computation, the processor is configured to: obtain a trusted key from the trusted key source; encrypt the private data based on the obtained trusted key to obtain ciphertext data; and transmit a computing parameter comprising at least the ciphertext data to other computing nodes participating in a secure multi-party computation for the other computing nodes to perform the secure multi-party computation based on collected computing parameters transmitted by the computing nodes participating in the secure multi-party computation.

In this embodiment, by reading and executing the machine-executable instructions stored in the memory and corresponding to control logic of secure multi-party computation, the processor may be further configured to: create an audit log corresponding to the ciphertext data transmitted by the computing node to the other computing nodes. The audit log may include description information related to the ciphertext data.

In this embodiment, by reading and executing the machine-executable instructions stored in the memory and corresponding to control logic of secure multi-party computation, the processor may be further configured to: collect computing parameters transmitted by the other computing nodes participating in the secure multi-party computation, the computing parameters comprising at least ciphertext data obtained by encrypting the private data held by the other computing nodes; perform the secure multi-party computation based on the collected computing parameters; and create an audit log corresponding to the ciphertext data transmitted by the other computing nodes. The audit log may include description information related to the encrypted private data.

In this embodiment, by reading and executing the machine-executable instructions stored in the memory and corresponding to control logic of secure multi-party computation, the processor may be further configured to: perform, based on the audit log, a privacy audit on the ciphertext data transmitted by the computing node participating in the secure multi-party computation, to determine whether the ciphertext data transmitted as a computing parameter by the computing node contains a privacy risk.

In this embodiment, the description information related to the ciphertext data may include an encryption key corresponding to the ciphertext data. By reading and executing the machine-executable instructions stored in the memory and corresponding to control logic of secure multi-party computation, the processor may be further configured to: verify whether the encryption key that is recorded in the audit log and corresponds to the ciphertext data transmitted by the computing node participating in the secure multi-party computation matches the trusted key from the trusted key source; and if it does, determine that the ciphertext data transmitted as the computing parameter by the computing node does not contain a privacy risk; or if it does not, determine that the ciphertext data transmitted as the computing parameter by the computing node contains a privacy risk.

In this embodiment, a decryption key corresponding to the ciphertext data and cleartext data corresponding to the ciphertext data may be further recorded in the audit log corresponding to the ciphertext data transmitted by the computing node to the other computing nodes. By reading and executing the machine-executable instructions stored in the memory and corresponding to control logic of secure multi-party computation, the processor may be configured to: decrypt, based on the decryption key that is recorded in the audit log and corresponds to the ciphertext data transmitted by the computing node participating in the secure multi-party computation, the ciphertext data to obtain decrypted cleartext data; verify whether the decrypted cleartext data matches the cleartext data that is recorded in the audit log and corresponds to the ciphertext data (i.e., original cleartext data); and if it does, determine that the ciphertext data transmitted as the computing parameter by the computing node does not contain a privacy risk; or if it does not, determine that the ciphertext data transmitted as the computing parameter by the computing node contains a privacy risk.

Other embodiments of this specification will be apparent to a person skilled in the art from consideration of the specification and practice of the present application disclosed here. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of this specification only be limited by the appended claims.

The foregoing descriptions are merely exemplary embodiments of this specification, but are not intended to limit this specification. Any modification, equivalent replacement, or improvement made without departing from the spirit and principle of this specification should fall within the protection scope of this specification.

What is claimed is:

1. A secure multi-party computation method, applied to one computing node of a plurality of computing nodes deployed in a distributed network, the plurality of computing nodes jointly participating in a secure multi-party computation based on data held on each of the plurality of computing nodes, and the one computing node coupled to a trusted key source, the method comprising:

obtaining, by the one computing node, a trusted key from the trusted key source;

encrypting, by the one computing node and based on the trusted key, the data held by the one computing node to obtain internal ciphertext data;

transmitting, by the one computing node, an internal computing parameter comprising at least the internal ciphertext data to other computing nodes of the plurality of computing nodes for the other computing nodes to perform the secure multi-party computation based on the internal computing parameter;

collecting, by the one computing node, an external computing parameter transmitted by one of the other computing nodes participating in the secure multi-party computation, the external computing parameter comprising at least external ciphertext data obtained by encrypting data held by the one of the other computing nodes;

creating a first audit log corresponding to the external ciphertext data, the first audit log comprising description information related to the external ciphertext data, wherein the description information comprises an encryption key corresponding to the external ciphertext data;

performing, based on the first audit log, a privacy audit on the external ciphertext data to determine whether the external ciphertext data contains a privacy risk by:
   determining whether the encryption key in the first audit log matches the trusted key from the trusted key source, by:
      determining, without decrypting the external ciphertext data, whether the encryption key in the first audit log is within a value range of a preset random number value space,
      determining, in response to a determination that the encryption key is within the value range, that the encryption key matches the trusted key, and
      determining, in response to a determination that the encryption key is not within the value range, that the encryption key does not match the trusted key; and
   determining, in response to the encryption key matching the trusted key from the trusted source, that the external ciphertext data does not contain a privacy risk; or
   determining, in response to the encryption key not matching the trusted key from the trusted source, that the external ciphertext data contains a privacy risk.

2. The method of claim 1, further comprising:
creating, by the one computing node, a second audit log corresponding to the internal ciphertext data, the second audit log comprising description information related to the internal ciphertext data.

3. The method of claim 2, further comprising:
performing, by the one computing node, the secure multi-party computation based on the external computing parameter.

4. The method of claim 3, further comprising:
transmitting the first audit log corresponding to the external ciphertext data to a third-party audit node for the third-party audit node to perform a privacy audit on the external ciphertext data to determine whether the external ciphertext data contains a privacy risk.

5. The method of claim 2, wherein the second audit log corresponding to the internal ciphertext data further comprises a decryption key corresponding to the internal ciphertext data and original cleartext data corresponding to the internal ciphertext data, and wherein the method further comprises:
   decrypting, based on the decryption key in the second audit log corresponding to the internal ciphertext data, the internal ciphertext data to obtain decrypted cleartext data; and
   verifying whether the decrypted cleartext data matches the original cleartext data; and
   determining, in response to the decrypted cleartext data matching the original cleartext data, that the internal ciphertext data does not contain a privacy risk; or
   determining, in response to the decrypted cleartext data not matching the original cleartext data, that the internal ciphertext data contains a privacy risk.

6. The method of claim 1, wherein the trusted key is a number, and
wherein the obtaining a trusted key from the trusted key source comprises any one of the following:
   obtaining an initial random number generated by the trusted key source, and using the initial random number as the trusted key;
   obtaining an initial random number generated by the trusted key source, obtaining a computation random number generated by the one computing node, and using a result obtained by further performing an operation on the initial random number and the computation random number as the trusted key;
   obtaining an initial random number generated by the trusted key source, and obtaining a functional number by inputting the initial random number into a key generation function, and using the functional number as the trusted key; and
   obtaining an initial random number generated by the trusted key source, obtaining a functional number by inputting the initial random number into a key generation function, obtaining a computation random number generated by the one computing node, using a result obtained by further performing an operation on the computation random number and the functional number as the trusted key.

7. The method of claim 1, wherein the distributed network is a blockchain network, and the plurality of computing nodes are node devices in the blockchain network.

8. A secure multi-party computation apparatus, comprising a processor and a non-transitory computer-readable memory coupled to the processor, and configured with instructions executable by the processor to perform operations, comprising:
   obtaining, by one computing node of a plurality of computing nodes, a trusted key from a trusted key source coupled to the one computing node, wherein the plurality of computing nodes deployed in a distributed network and jointly participating in a secure multi-party computation based on data held on each of the plurality of computing nodes;
   encrypting, by the one computing node and based on the trusted key, the data held by the one computing node to obtain internal ciphertext data;
   transmitting, by the one computing node, an internal computing parameter comprising at least the internal ciphertext data to other computing nodes of the plurality of computing nodes for the other computing nodes to perform the secure multi-party computation based on the internal computing parameter;
   collecting, by the one computing node, an external computing parameter transmitted by one of the other computing nodes participating in the secure multi-party computation, the external computing parameter comprising at least external ciphertext data obtained by encrypting data held by the one of the other computing nodes;
   creating a first audit log corresponding to the external ciphertext data, the first audit log comprising description information related to the external ciphertext data, wherein the description information comprises an encryption key corresponding to the external ciphertext data;
   performing, based on the first audit log, a privacy audit on the external ciphertext data to determine whether the external ciphertext data contains a privacy risk by:
      determining whether the encryption key in the first audit log matches the trusted key from the trusted key source, by:
         determining, without decrypting the external ciphertext data, whether the encryption key in the first audit log is within a value range of a preset random number value space,
         determining, in response to a determination that the encryption key is within the value range, that the encryption key matches the trusted key, and determining, in response to a determination that the encryption key is not within the value range, that the encryption key does not match the trusted key; and determining, in response to the encryption key matching the trusted key from the trusted source, that the external ciphertext data does not contain a privacy risk; or determining, in response to the encryption key not matching the trusted key from the trusted source, that the external ciphertext data contains a privacy risk.

9. The apparatus of claim 8, wherein the operations further comprise:

creating, by the one computing node, a second audit log corresponding to the internal ciphertext data, the second audit log comprising description information related to the internal ciphertext data.

10. The apparatus of claim 9, wherein the operations further comprise:

performing, by the one computing node, the secure multi-party computation based on the external computing parameter.

11. The apparatus of claim 10, wherein the operations further comprise:

transmitting the first audit log corresponding to the external ciphertext data to a third-party audit node for the third-party audit node to perform a privacy audit on the external ciphertext data to determine whether the external ciphertext data contains a privacy risk.

12. The apparatus of claim 9, wherein the second audit log corresponding to the internal ciphertext data further comprises a decryption key corresponding to the internal ciphertext data and original cleartext data corresponding to the internal ciphertext data, and wherein the operations further comprise:

decrypting, based on the decryption key in the second audit log corresponding to the internal ciphertext data, the internal ciphertext data to obtain decrypted cleartext data; and verifying whether the decrypted cleartext data matches the original cleartext data; and determining, in response to the decrypted cleartext data matching the original cleartext data, that the internal ciphertext data does not contain a privacy risk; or determining, in response to the decrypted cleartext data not matching the original cleartext data, that the internal ciphertext data contains a privacy risk.

13. The apparatus of claim 8, wherein the trusted key is a number, and wherein the obtaining a trusted key from the trusted key source comprises any one of the following:

obtaining an initial random number generated by the trusted key source, and using the initial random number as the trusted key;

obtaining an initial random number generated by the trusted key source, obtaining a computation random number generated by the one computing node, and using a result obtained by further performing an operation on the initial random number and the computation random number as the trusted key;

obtaining an initial random number generated by the trusted key source, and obtaining a functional number by inputting the initial random number into a key generation function, and using the functional number as the trusted key; and obtaining an initial random number generated by the trusted key source, obtaining a functional number by inputting the initial random number into a key generation function, obtaining a computation random number generated by the one computing node, using a result obtained by further performing an operation on the computation random number and the functional number as the trusted key.

14. The apparatus of claim 8, wherein the distributed network is a blockchain network, and the plurality of computing nodes are node devices in the blockchain network.

15. A non-transitory computer-readable storage medium having instructions stored thereon executable by a processor to cause the processor to perform operations comprising:

obtaining, by one computing node of a plurality of computing nodes, a trusted key from a trusted key source coupled to the one computing node, wherein the plurality of computing nodes deployed in a distributed network and jointly participating in a secure multi-party computation based on data held on each of the plurality of computing nodes;

encrypting, by the one computing node and based on the trusted key, the data held by the one computing node to obtain internal ciphertext data;

transmitting, by the one computing node, an internal computing parameter comprising at least the internal ciphertext data to other computing nodes of the plurality of computing nodes for the other computing nodes to perform the secure multi-party computation based on the internal computing parameter;

collecting, by the one computing node, an external computing parameter transmitted by one of the other computing nodes participating in the secure multi-party computation, the external computing parameter comprising at least external ciphertext data obtained by encrypting data held by the one of the other computing nodes;

creating a first audit log corresponding to the external ciphertext data, the first audit log comprising description information related to the external ciphertext data, wherein the description information comprises an encryption key corresponding to the external ciphertext data;

performing, based on the first audit log, a privacy audit on the external ciphertext data to determine whether the external ciphertext data contains a privacy risk by:

determining whether the encryption key in the first audit log matches the trusted key from the trusted key source, by:

determining, without decrypting the external ciphertext data, whether the encryption key in the first audit log is within a value range of a preset random number value space, determining, in response to a determination that the encryption key is within the value range, that the encryption key matches the trusted key, and determining, in response to a determination that the encryption key is not within the value range, that the encryption key does not match the trusted key; and determining, in response to the encryption key matching the trusted key from the trusted source, that the external ciphertext data does not contain a privacy risk; or determining, in response to the encryption key not matching the trusted key from the trusted source, that the external ciphertext data contains a privacy risk.

16. The storage medium of claim 15, wherein the operations further comprise:

creating, by the one computing node, a second audit log corresponding to the internal ciphertext data, the second audit log comprising description information related to the internal ciphertext data.

17. The storage medium of claim 16, wherein the operations further comprise:

performing, by the one computing node, the secure multi-party computation based on the external computing parameter.

18. The storage medium of claim 17, wherein the operations further comprise:

transmitting the first audit log corresponding to the external ciphertext data to a third-party audit node for the third-party audit node to perform a privacy audit on the external ciphertext data to determine whether the external ciphertext data contains a privacy risk.

* * * * *